(12) United States Patent
Fischer et al.

(10) Patent No.: US 7,321,156 B2
(45) Date of Patent: Jan. 22, 2008

(54) DEVICE FOR CAPACITIVE PRESSURE MEASUREMENT AND METHOD FOR MANUFACTURING A CAPACITIVE PRESSURE MEASURING DEVICE

(75) Inventors: Frank Fischer, Gomaringen (DE);
Hans-Peter Trah, Stuttgart (DE);
Franz Laermer, Weil Der Stadt (DE);
Lars Metzger, Moessingen-Belson (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 10/897,449

(22) Filed: Jul. 22, 2004

(65) Prior Publication Data
US 2005/0029607 A1 Feb. 10, 2005

(30) Foreign Application Priority Data
Jul. 25, 2003 (DE) ................. 103 33 960

(51) Int. Cl.
*H01L 29/82* (2006.01)

(52) U.S. Cl. .................. 257/417; 257/254; 257/414

(58) Field of Classification Search ............... 257/254, 257/414, 417
See application file for complete search history.

(56) References Cited

U.S. PATENT DOCUMENTS

| 5,211,058 | A | * | 5/1993 | Fukiura et al. | ............... 73/724 |
| 5,277,068 | A | * | 1/1994 | Fukiura et al. | ............... 73/724 |
| 2003/0215976 | A1 | * | 11/2003 | Chou et al. | ................... 438/57 |
| 2006/0014392 | A1 | * | 1/2006 | Benzel et al. | ............... 438/700 |

* cited by examiner

*Primary Examiner*—Long Pham
(74) *Attorney, Agent, or Firm*—Kenyon & Kenyon LLP

(57) ABSTRACT

A device for manufacturing a capacitive pressure measurement includes an insulated base electrode, a mechanically deflectable counterelectrode composed of a layer made of at least one of a monocrystalline and polycrystalline semiconductor material, a contact arrangement for electrically connecting the electrodes, and at least one semiconductor component, all integrated onto a semiconductor substrate. The connection for the base electrode is formed by an electrically insulated conductive polycrystalline semiconductor layer. The method for manufactured the device includes the step of arranging a conductive polycrystalline semiconductor layer between two insulating layers on the semiconductor substrate for forming a base electrode.

6 Claims, 1 Drawing Sheet

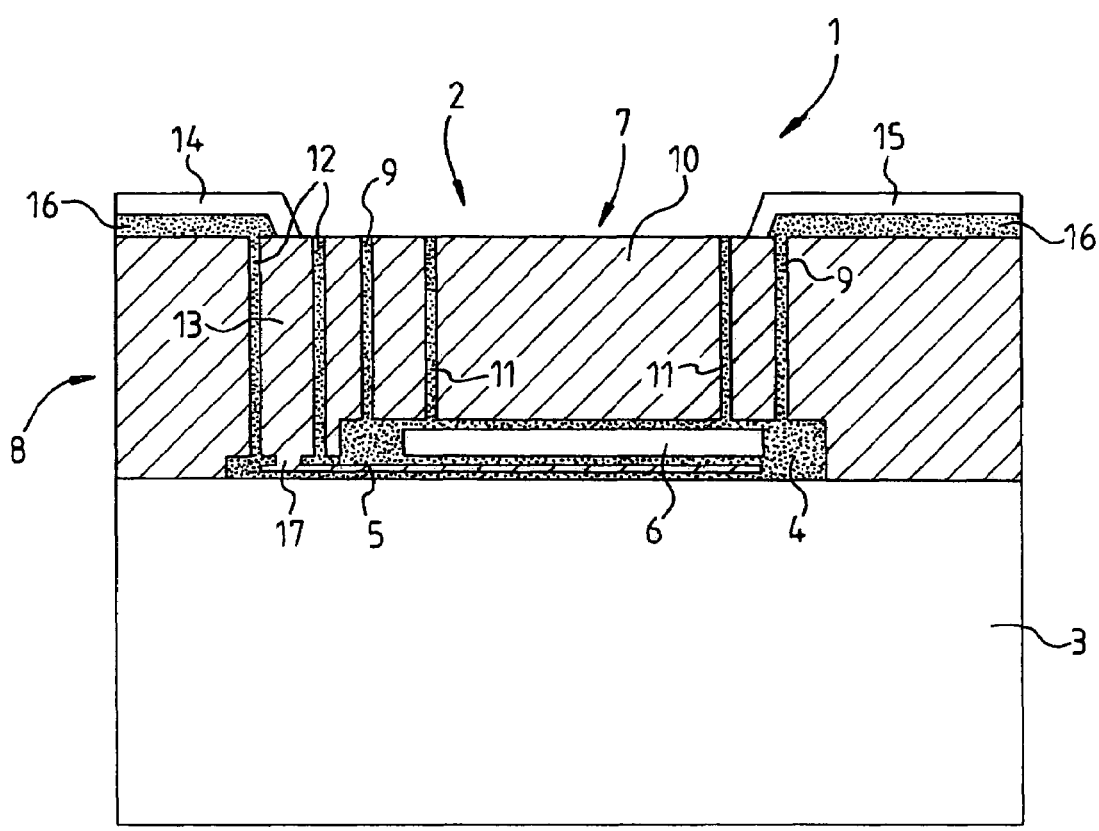

DEVICE FOR CAPACITIVE PRESSURE MEASUREMENT AND METHOD FOR MANUFACTURING A CAPACITIVE PRESSURE MEASURING DEVICE

CROSS-REFERENCE TO RELATED APPLICATIONS

The present application claims priority to Application No. 103 33 960.4, filed in the Federal Republic of Germany on Jul. 25, 2003, which is expressly incorporated herein in its entirety by reference thereto.

FIELD OF THE INVENTION

The present invention relates to a device for capacitive pressure measurement and to a method for manufacturing a device for capacitive pressure measurement.

BACKGROUND INFORMATION

Capacitive surface micromechanical (SMM) pressure sensors are believed to be conventional. In contrast to piezoresistive sensors, capacitive sensors may provide that the measuring capacitors contained can be evaluated with practically no power consumption, since in particular no high currents flow through stress detectors in the form of ohmic resistors. Furthermore, the capacitive measuring signal is largely independent of the temperature.

For many applications, capacitive pressure sensors are desired which can be constructed within the scope of an IC manufacturing process using monolithic integration.

SUMMARY

According to an exemplary embodiment of the present invention, a capacitive pressure sensor, e.g., a silicon surface micromechanical (SMM) pressure sensor, may be monolithically integrated using conventional IC circuit technology.

An exemplary embodiment of the present invention may provide a device for capacitive pressure measurement in which an insulated base electrode, a mechanically deflectable counterelectrode composed of a layer made of monocrystalline and/or polycrystalline semiconductor material, a contact arrangement for electrically connecting the electrodes, and at least one semiconductor component are integrated onto a semiconductor substrate, such as a silicon wafer. A feature of this device is that the connection of the base electrode to a metal plating may be formed by a dielectrically insulated conductive polycrystalline semiconductor layer, e.g., as a connecting pad, which on its top may be in direct contact with the metal plating. This procedure may provide that leakage currents to the surroundings, e.g., in the lateral direction, may be largely avoided as the result of the dielectric insulation.

In an exemplary embodiment of the present invention, the base electrode is connected via the polycrystalline layer, from which the sensor diaphragm or the counterelectrode is also formed, by using a portion of the layer for providing a "contact pad," which in the lateral direction is electrically insulated from the surroundings in a trench, which after being produced has been filled, at least partially, with insulating material. A base electrode is thus contacted from "above" by the monocrystalline and/or polycrystalline layer. This structure may be produced in an effective manner when the counterelectrode or its insulation structure is defined at the same time that a "contact pad" is formed. This structure may be electrically completely insulated from the surroundings in the lateral direction by a frame filled with insulating material, such as silicon oxide.

Furthermore, in an exemplary embodiment of the present invention, the layer may be applied in monocrystalline form in the lateral direction outside the region of the electrodes. In other words, the semiconductor material, for example, silicon, is polycrystalline only in the actual sensor region where buried layers are used. Outside this region, however, monocrystalline material, such as c-Si, may be present. It may be possible to integrate the circuit and to locate the evaluation circuit directly around the actual sensor element.

The base electrode may be composed of conductive polycrystalline semiconductor material, such as polycrystalline silicon. This polycrystalline electrode may be connected from above, via the polycrystalline "contact pad," in the layer from which the counterelectrode is also formed, on a comparatively short path having an evaluation circuit, which is directly integrated into the immediately adjoining monocrystalline semiconductor material. Thus, impedance conversion, which due to the very short connection paths is insensitive to interference, may be performed very close to the sensor element.

The layer from which the counterelectrode is formed may be comparatively very thick, so that in addition to mechanical aspects an effective shielding of the base electrode may be achieved, which in principle may be insensitive to electrostatic discharge (ESD). The highly conductive, thick counterelectrode situated thereabove may keep electrical fields away from the base electrode, thereby facilitating the ESD resistance of the structure.

An exemplary embodiment of the present invention may provide a method for manufacturing a device for capacitive pressure measurement in which an insulated base electrode, a mechanically deflectable counterelectrode composed of a layer made of monocrystalline and/or polycrystalline semiconductor material, a contact arrangement for electrically connecting the electrodes, and at least one semiconductor component are integrated onto a semiconductor substrate. On the semiconductor substrate, such as a silicon wafer, a conductive polycrystalline semiconductor layer is situated between two insulating layers for forming a base electrode and, e.g., a connection contact from the base electrode. Using this procedure, it is possible to insulate the polycrystalline electrode from the surroundings such that leakage currents may be largely avoided. Furthermore, the polycrystalline layer may be sufficiently protected from an etching medium for etching a sacrificial layer situated thereabove, which optionally may also be composed of polysilicon. Moreover, an etching technique which is "IC compatible," such as a chlorotrifluoride ($ClF_3$) etching technique, for example, may be used for removing the sacrificial layer.

In an exemplary embodiment of the present invention, one or more trenches are introduced into and extend through the polycrystalline and/or monocrystalline layer from which the counterelectrode is also formed to produce an island region, isolated from the other layer, for continuing the connection for the base electrode. This measure may result in a lead to the electrode which may be particularly well insulated with respect to the surroundings on account of its being dielectric. This island region in the polycrystalline and/or monocrystalline layer may be composed of conductive polycrystalline semiconductor material, such as (highly) doped silicon.

In an exemplary embodiment of the present invention, at the same time the island region is produced, etched holes to a sacrificial layer and/or a framed region for defining and isolating the counterelectrode may be etched through the polycrystalline and/or monocrystalline layer. In this manner, it may be possible to efficiently produce in one etching step a large number of structures, namely, an island region for providing and insulating a connection for the base electrode, etched holes to a sacrificial layer, and an upper counterelectrode, which is electrically insulated from the surroundings on all sides via a frame region.

Before the polycrystalline and/or monocrystalline layer is applied, the sacrificial layer is may be produced over the base electrode and covered with a layer of silicon oxides, for example, against which the sacrificial layer may be selectively etched. Thus, as a result of etched channels on the sacrificial layer, the sacrificial layer may be removed later without undesired impairment of adjoining layers.

For the case that a polycrystalline silicon sacrificial layer is used, this layer may then be removed, for example up to the point before the top metal level is reached, using a $ClF_3$ etching technique which is IC-compatible with a circuit that is already situated on the top after carrying out a circuit process. Before such an etching process is performed, the etching channels to the silicon sacrificial layer, for example, may be provided with side wall passivation so that no undesired etching of the polycrystalline and/or monocrystalline layer occurs there. Plasma-deposited Teflon layers or deposited oxide layers may be used as side wall passivation.

The silicon sacrificial layer for producing a cavity below the polycrystalline diaphragm is removed in an IC-compatible manner using a $ClF_3$ etching technique. Deflectable mechanical elements are produced only near the end of the overall process, so that there may be no need to consider deflectable mechanical elements until this process stage is reached. In the removal of the sacrificial layer, the $ClF_3$ etching technique may not have the IC compatibility problems which may arise when HF vapor is used in the sacrificial layer technique. In addition, the area which may be reached by underetching may be relatively large, and the rate of underetching in silicon may be relatively high for the $ClF_3$ etching technique, so that very few etching openings in the polycrystalline and/or monocrystalline layer extending to the sacrificial layer may be required.

If needed, HF vapor may be subsequently used in a very brief etching step to "smoke out" the thin etch stop layers, such as those composed of silicon oxides, below the diaphragm or counterelectrode and on the base electrode in the cavity region. Such an etching step which acts only for a brief period of time may not appreciably damage the IC structures already present on the top side. Etching channels and frames, or trench regions may be filled with insulating material, for example silicon oxide, in an appropriate vacuum deposition step, which may be conventional. When the channels and/or trenches are filled, the cavity is thus closed off by a process pressure, approximating vacuum conditions, which prevails during the filling.

Traditional IC processes, such as a CMOS process, for example, may be suited for producing the circuit electronics on or in the monocrystalline and/or polycrystalline layer. A CMOS process may provide that the thickness of the monocrystalline and/or polycrystalline layer may be freely selected over a wide range, since only flat diffusions on the surface are adequate for the modern CMOS processes generally used.

Using the referenced method, it is possible to produce, e.g., the devices for capacitive pressure measurement described above, in which a capacitive surface micromechanical pressure sensor is used which, as the result of its IC-compatible processing and a comparatively thick counterelectrode diaphragm layer, may provide from the standpoint of reliable functioning, stability, and good shielding characteristics with respect to electrostatic discharges and electrical fields. On account of the capacitive evaluation principle, such a device may use power economically and may be robust with regard to temperature fluctuations, and may thus be preferentially used where low power consumption is an important criterion.

According to an exemplary embodiment of the present invention, a device for capacitive pressure measurement includes: an insulated base electrode; a mechanically deflectable counterelectrode including a layer made of at least one of (a) a monocrystalline semiconductor material and (b) a polycrystalline semiconductor material; a contact arrangement configured to electrically connect the electrode and the counterelectrode; and at least one semiconductor component. The base electrode, the counterelectrode, the contact arrangement and the semiconductor component are integrated onto a semiconductor substrate, and a connection of the contact arrangement of the base electrode to metal plating includes a dielectrically insulated conductive polycrystalline semiconductor layer.

The connection may include a layer made from the at least one of (a) the polycrystalline semiconductor material and (b) the monocrystalline semiconductor material from which the counterelectrode is formed. A portion of the layer of the connection may be electrically insulated in a lateral direction from a surrounding layer by a trench. The trench may be at least partially refilled with an insulating material to provide a contact pad.

The layer made from the at least one of (a) the polycrystalline semiconductor material and (b) the monocrystalline semiconductor material outside a region of the electrode and the counterelectrode may be grown in monocrystalline form.

The base electrode may include a conductive polycrystalline semiconductor layer.

The counterelectrode may be electrically insulated from surroundings in a lateral direction by a frame filled with an insulating material.

The counterelectrode may include a silicon layer.

According to an exemplary embodiment of the present invention, a method for manufacturing a device for capacitive pressure measurement includes the steps of: arranging a conductive polycrystalline semiconductor layer between two insulating layers on a semiconductor substrate to form a base electrode; and integrating onto the semiconductor substrate: (a) the base electrode; (b) a mechanically deflectable counterelectrode composed of a layer made of at least one of (a) a monocrystalline semiconductor material and (b) a polycrystalline semiconductor material; (c) a contact arrangement configured to electrically connect the base electrode and the counterelectrode; and (d) at least one semiconductor component.

The method may include the step of producing an island region by introducing at least one trench all the way through the layer made of the at least one of (a) the monocrystalline semiconductor material and (b) the polycrystalline semiconductor material from which the counterelectrode is also formed. The island region may be isolated from a remainder of the layer and may be arranged to continue a connection for the base electrode.

The method may include the step of etching holes at the same time when island region is produced. The holes may be etched through the layer made of the at least one of (a) the monocrystalline semiconductor material and (b) the polycrystalline semiconductor material to at least one of (a) a sacrificial layer and (b) a framed region to define the counterelectrode.

The method may include the steps of: producing a sacrificial layer, a barrier layer covering the sacrificial layer, the sacrificial layer selectively etchable against the barrier layer; and after the sacrificial layer producing step, applying the layer made of the at least one of (a) the monocrystalline semiconductor material and (b) the polycrystalline semiconductor material over the base electrode.

The sacrificial layer may include a silicon layer, and the barrier layer may include one of (a) a silicon oxide and (b) a silicon oxynitride layer.

The method may include the step of removing the sacrificial layer using an $ClF_3$ etching technique.

The method may include the step of removing in a comparatively brief HF etching step at least one of (a) an $SiO_2$ layer on the base electrode and (b) a layer over the sacrificial layer.

The layer made of the at least one of (a) the monocrystalline semiconductor material and (b) the polycrystalline semiconductor material may include silicon.

The sacrificial layer may include a polysilicon layer.

According to an exemplary embodiment of the present invention, a device for capacitive pressure measurement includes: insulated base electrode means; mechanically deflectable counterelectrode means including a layer made of at least one of (a) a monocrystalline semiconductor material and (b) a polycrystalline semiconductor material; contact means for electrically connecting the electrode and the counterelectrode; and at least one semiconductor component means. The base electrode means, the counterelectrode means, the contact means and the semiconductor component means are integrated onto semiconductor substrate means. A connecting means of the contact means of the base electrode means to metal plating means includes a dielectrically insulated conductive polycrystalline semiconductor layer.

BRIEF DESCRIPTION OF THE DRAWING

FIG. 1 is a schematic cross-sectional view of a pressure measuring device 1 of an exemplary embodiment of the present invention.

DETAILED DESCRIPTION

FIG. 1 is a schematic cross-sectional view of the structure of a pressure measuring device 1 of an exemplary embodiment of the present invention having a capacitive surface micromechanical (SMM) pressure sensor 2.

As shown by example, the structure here is based on a monocrystalline p-doped silicon wafer 3 which is used as a standard wafer in IC production.

On the wafer a conductive polycrystalline silicon base electrode 5 is embedded in silicon oxide 4. A cavity 6 is formed above the polysilicon base electrode so that a diaphragm made of polycrystalline silicon situated thereabove may be deflected into cavity region 6.

Diaphragm 7 is part of a layer 8, which is produced by epitaxial growth on the wafer or on a starting layer above the cavity/base electrode region.

To form a counterelectrode 10 above base electrode 5, this layer is provided with a frame-shaped trench 9, which extends through the layer and is filled with silicon oxide. Etching channels 11 to cavity 6, which are filled with silicon oxide, are situated within frame 9.

A connecting pad 13, which is produced as the result of a trench 12 which has been filled with silicon oxide, passes through layer 8 to polycrystalline base electrode 5, which is embedded in silicon oxide 4.

On the top of layer 8 a connection metal plating 14 and 15 for connecting pad 13 and counterelectrode 10, respectively, above an insulating oxide 16 is schematically illustrated.

Directly adjacent and lateral to the SMM pressure sensor, circuit electronics are integrated into or onto layer 8 to allow an impedance conversion and evaluation of the change in capacitance of the pressure sensor to occur as close as possible to SMM pressure sensor 2.

As an example, buried base electrode 5 may be connected over a comparatively short path to a gate of a field effect transistor for capacitance/voltage conversion. Upper counterelectrode 10 itself may be connected at low impedance to a clock generator for the capacitance/voltage converter and in addition may provide good shielding for buried electrode 5. A comparatively thick layer 8, from which sensor diaphragm 7 is formed, may provide improved characteristics from both a mechanical and an electrical standpoint compared to thin polysilicon layers that may be conventional.

As a result of the epitaxial growth of layer 8 above the base, this layer, where no SMM pressure sensor structure is formed and where the epitaxy therefore starts from the Si substrate, is monocrystalline. However, in the "sensor region" having a polysilicon starting layer which is correspondingly applied over this region and which is formed from a previous LPCVD deposition, the layer is polycrystalline.

This results in the possibility of providing circuit integration directly outside the "sensor region" in the monocrystalline material, using conventional IC technology, e.g., CMOS technology, by which an evaluation circuit for SMM pressure sensor 2 is optionally provided at the same time.

The manufacturing process for the monolithically integrated pressure measuring device 1 is as follows:

A. First, silicon wafer 3 is oxidized and the oxide is structured.

B. A conductive polycrystalline silicon layer is then produced in a structured form for forming base electrode 5.

C. A second silicon oxide layer is placed and structured over this structure.

D. Polysilicon is then applied and structured as a sacrificial layer to form cavity region 6.

E. The next step is the application and structuring of a third silicon oxide layer. A contact opening 17 is provided through the oxide layers and in the finished pressure measuring device it is filled with epitaxial polysilicon.

F. In addition, a starting polysilicon layer for the epitaxy is deposited and structured and is confined to a sensor core.

G. Doping is introduced into the starting polysilicon layer in the sensor region for the connection of the buried counterelectrode and optionally is introduced into the c-silicon in the IC region for the "buried layer" or a "lower insulation diffusion" in the event that a BiCMOS process is used (otherwise, doping of the c-silicon is omitted).

H. The epitaxial silicon is grown thereon, resulting in a polycrystalline layer in the diaphragm/electrode region and a monocrystalline layer in the circuit region, through the corresponding background (substrate or poly-Si starting layer).

I. An IC process is carried out on the epitaxially grown silicon before the metal plating is reached, or up to the top metal level.

J. Then, a "field oxide" for defining trenches for the production of etching channels to the sacrificial layer, present from the IC process, for example, is structured by insulating frames 9 or 12, or another oxide is grown/applied thereto and structured, and the trenches are produced in the silicon.

K. Side wall passivation is then carried out in the trenches (using TEOS/ozone or a low-temperature oxide deposition, for example), and the thin silicon oxide above the sacrificial polysilicon is removed. The thicker silicon oxide is also attached at the locations where the trenches are not present above the sacrificial polysilicon. However, no silicon is exposed or made accessible there on account of the comparatively thick oxide.

L. The polycrystalline sacrificial silicon for producing cavity 6 is etched out using the chlorotrifluoride ($ClF_3$) sacrificial layer technique.

M. The comparatively thin silicon oxide below sensor diaphragm 7 and counterelectrode 5 may be removed in the cavity region by optional brief "smoking out" in HF vapor. However, the oxides may remain without disadvantages for the function.

N. In the next step the trenches or channels are filled with silicon oxide. The silicon oxide is then planarized and structured, the oxide in the IC region being also structured. For example, contact holes are opened before the sealing metal plating is applied.

O. The metal plating (or the top metal level) is then applied and structured.

P. In the last step, IC passivation is applied and structured.

What is claimed is:

1. A device for capacitive pressure measurement, comprising:
    an insulated base electrode;
    a mechanically deflectable counterelectrode including a layer made of at least one of (a) a monocrystalline semiconductor material and (b) a polycrystalline semiconductor material;
    a contact arrangement configured to electrically connect the electrode and the counterelectrode; and
    at least one semiconductor component;
    wherein the base electrode, the counterelectrode, the contact arrangement and the semiconductor component are integrated onto a semiconductor substrate; and
    wherein a connection of the contact arrangement of the base electrode to a metal plating includes a dielectrically insulated conductive polycrystalline semiconductor layer.

2. The device of claim 1, wherein the connection includes a layer made from the at least one of (a) the polycrystalline semiconductor material and (b) the monocrystalline semiconductor material from which the counterelectrode is formed, a portion of the layer of the connection electrically insulated in a lateral direction from a surrounding layer by a trench, the trench at least partially refilled with an insulating material to provide a contact pad.

3. The device of claim 1, wherein the layer made from the at least one of (a) the polycrystalline semiconductor material and (b) the monocrystalline semiconductor material outside a region of the electrode and the counterelectrode is grown in monocrystalline form.

4. The device of claim 1, wherein the base electrode includes a conductive polycrystalline semiconductor layer.

5. The device of claim 1, wherein the counterelectrode is electrically insulated from surroundings in a lateral direction by a frame filled with an insulating material.

6. The device of claim 1, wherein the counterelectrode includes a silicon layer.

* * * * *